United States Patent
Albasheir et al.

(10) Patent No.: US 11,490,318 B2
(45) Date of Patent: *Nov. 1, 2022

(54) TRANSPARENT SESSION MIGRATION BETWEEN USER PLANE FUNCTIONS

(71) Applicant: T-Mobile USA, Inc., Bellevue, WA (US)

(72) Inventors: Suliman Albasheir, Issaquah, WA (US); Boris Antsev, Bothell, WA (US); Christopher H. Joul, Bellevue, WA (US); Rahul Pal, Bellevue, WA (US); Suresh Thanneeru, Redmond, WA (US); Karunakalage Viraj Rakitha Silva, Renton, WA (US); Salvador Mendoza, Issaquah, WA (US); Rushabhkumar Patel, Newcastle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/069,481

(22) Filed: Oct. 13, 2020

(65) Prior Publication Data
US 2021/0029617 A1    Jan. 28, 2021

Related U.S. Application Data

(63) Continuation of application No. 16/363,947, filed on Mar. 25, 2019, now Pat. No. 10,813,035.
(Continued)

(51) Int. Cl.
*H04W 40/34* (2009.01)
*H04W 28/02* (2009.01)

(52) U.S. Cl.
CPC ....... *H04W 40/34* (2013.01); *H04W 28/0247* (2013.01)

(58) Field of Classification Search
CPC .......................... H04W 40/34; H04W 28/0247
(Continued)

(56) References Cited

U.S. PATENT DOCUMENTS

| 2017/0289270 A1 | 10/2017 | Li et al. |
| 2018/0270782 A1 | 9/2018 | Park et al. |
| 2020/0137663 A1 | 4/2020 | Mbasheir et al. |

FOREIGN PATENT DOCUMENTS

| KR | 20180106400 A | 10/2018 |
| WO | WO2018006017 A1 | 1/2018 |

(Continued)

OTHER PUBLICATIONS

Office Action for U.S. Appl. No. 16/363,947, dated Mar. 17, 2020, Albasheir, "Transparent Session Migration Between User Plane Functions", 12 Pages.
(Continued)

*Primary Examiner* — Gbemileke J Onamuti
(74) *Attorney, Agent, or Firm* — Lee & Hayes, P.C.

(57) ABSTRACT

Systems, devices, and techniques described herein relate to migrating a communication session from a path including a stressed user plane function (UPF) to a path including a replacement UPF. A communication session may traverse a first path including the first UPF. After establishing the communication session, the first UPF may be determined to be stressed. In response, the communication session can be proactively migrated to a second path including a second UPF. According to various implementations, the existing communication session can be maintained during the migration, thereby substantially eliminating interruptions caused by the stressed first UPF.

20 Claims, 6 Drawing Sheets

Related U.S. Application Data

(60) Provisional application No. 62/752,172, filed on Oct. 29, 2018.

(58) Field of Classification Search
USPC .......................................................... 370/331
See application file for complete search history.

(56) References Cited

FOREIGN PATENT DOCUMENTS

| | | |
|---|---|---|
| WO | WO2018171859 A1 | 9/2018 |
| WO | WO2018175034 A1 | 9/2018 |

OTHER PUBLICATIONS

The PCT Search Report and Written Opinion dated Feb. 4, 2020, for PCT Application No. PCT/US2019/056092, 11 pages.
European Search Report dated Jun. 2, 2022 for European Patent Application No. 19879126.1, 10 pages.
Huawei, et al., "Resource management of UPF shared by multiple SMFs", 3GPP Draft, vol. SA WG2, No. S2-183458, Apr. 10, 2018, 5 pages.

TRANSPARENT SESSION MIGRATION BETWEEN USER PLANE FUNCTIONS

CROSS-REFERENCE TO RELATED APPLICATION

This is a continuation application which claims priority to commonly assigned, co-pending U.S. patent application Ser. No. 16/363,947, filed Mar. 25, 2019, which claims priority to U.S. Provisional Application No. 62/752,172, filed on Oct. 29, 2018. Application Ser. Nos. 16/363,947 and 62/752, 172 are fully incorporated herein by reference.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UNITS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies, among other forthcoming technologies, to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
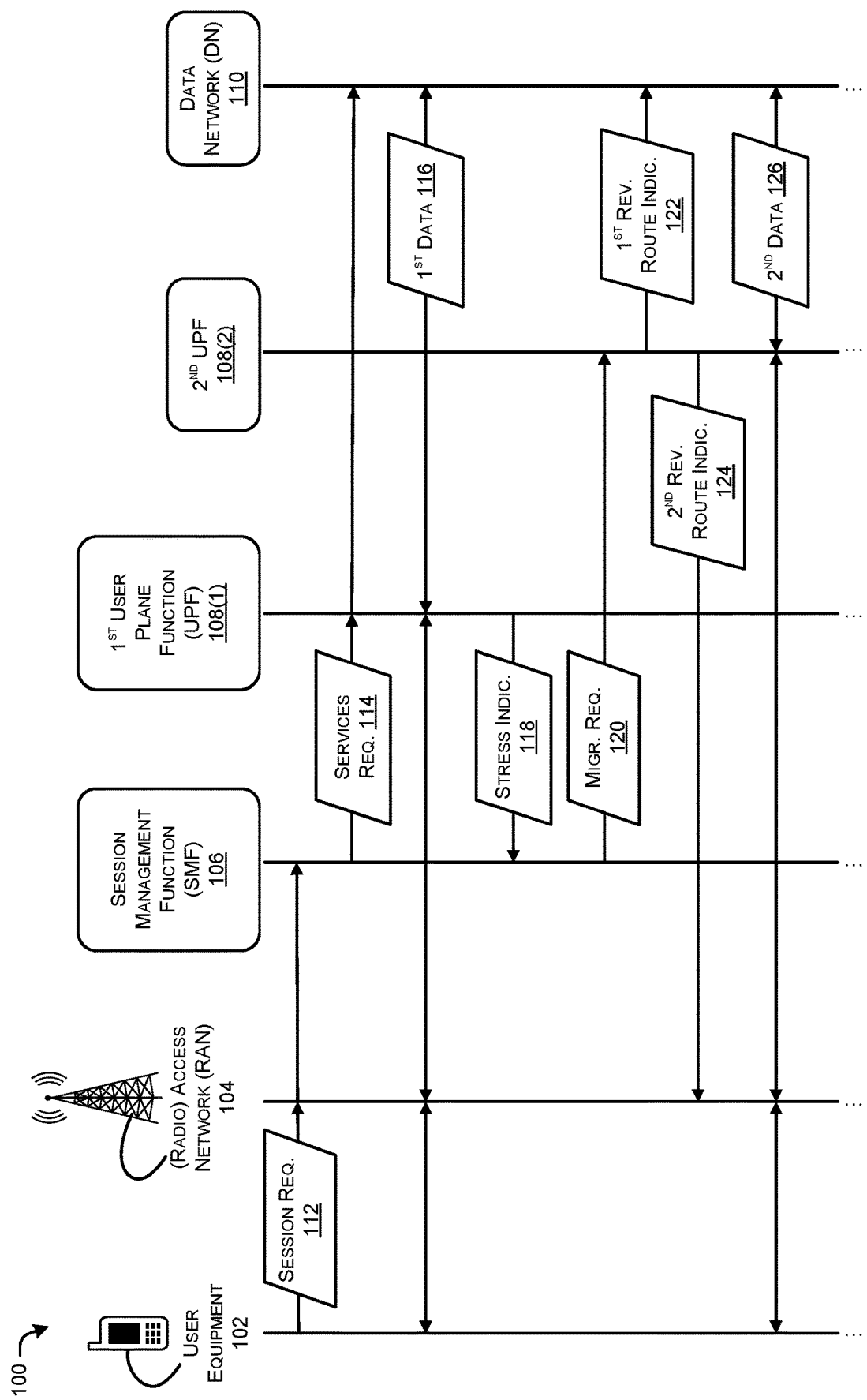
FIG. 1 is a diagram illustrating example signaling between a user equipment (UE) and various components of a mobile network, such as a fifth generation (5G) mobile network, as described herein

The systems, devices, and techniques described herein relate to user plane system migration in mobile networks. In particular, the systems, devices, and techniques can be implemented in fifth generation (5G) mobile networks to provide intelligent migration of a session from a first user plane function (UPF) to a second UPF.

A user device may receive services from a domain or data network (DN) in a communication session via a particular UPF. However, if the particular UPF is in distress (e.g., the UPF is failing, has failed, is overloaded, is in danger of being overloaded, is experiencing relatively high latency, or the like), the UPF may cause at least a portion of the services to be delayed from reaching the user device. In the case of a complete failure of the particular UPF, the user device may have to establish an entirely new communication session in order to continue receiving the services.

Establishing a new communication session can be problematic. Establishing a new communication session can take a significant amount of time, which can delay services delivered to the user device. In addition, establishing a new communication session can occupy network resources that could otherwise be applied to other tasks. For example, establishing a new communication session may require the user device to establish a new connection with a new signaling system (which can include, e.g., an access and mobility management function (AMF) and/or a session management function (SMF)). The signaling system may have to assign a new internet protocol (IP) address to the user device, select a new UPF to provide services to the user device, establish the new communication session with the user device, and the like. The various processes required to establish a new communication session can introduce further delays to the services and can occupy an unnecessary amount of resources within the network.

To address these and other problems, various implementations relate to migrating an existing communication session from a first path, which includes a stressed UPF, to a second path, which excludes the stressed UPF. The communication session can be migrated in a manner that is transparent to the user device, such that the migration does not interrupt services at the user device.

The UPF can be determined to be stressed using a variety of techniques. In some implementations, the stressed UPF is identified when a periodic heartbeat message from the stressed UPF is interrupted. In certain implementations, the stressed UPF identifies itself by transmitting an offloading request upon determining that it should offload data traffic.

The communication session can be migrated by causing a replacement UPF to export at least one revised route for the communication session to at least one node in the first path. The revised route may specify the replacement UPF and exclude the stressed UPF. For example, the revised route may instruct a node to transmit data destined for the user device to the replacement UPF, rather than to the stressed UPF. In some examples, the revised route may instruct a node to transmit data from the user device to the replacement UPF, rather than to the stressed UPF. Accordingly, the second path can include some of the nodes of the first path and the replacement UPF but can exclude the stressed UPF.

In particular implementations, a signaling system can initiate the migration of the session from the initial UPF to the replacement UPF. In certain instances, a session management function (SMF) determines whether the migration should occur and initiates the migration by signaling the replacement UPF.

In various implementations, the communication session can be migrated to an existing UPF, rather than generating a new node or regenerating the stressed UPF as a virtual machine. In some examples, the signaling system instructs the replacement UPF to export the migrated route to at least one node that is connected stressed UPF, rather than to the user device itself. Accordingly, the session can be migrated in a manner that is transparent to the user device.

Various implementations represent improvements to the field of networks. In particular, various implementations efficiently handle UPF failure and UPF overload scenarios, without significantly affecting user experience by migrating existing communication sessions from stressed UPFs to non-stressed UPFs in a manner that is transparent to user devices engaged in the communication sessions.

The various functions, gateways, nodes, and components discussed herein can be implemented either as a network element on a dedicated hardware, as a software instance running on a dedicated hardware, or as a virtualized function instantiated on an appropriate platform, such as a cloud infrastructure.

The system, devices, and techniques described herein can be applied to selecting any function in a mobile network based at least in part on latency. For example, various components of a fifth generation (5G) mobile network can include, but are not limited to, a network exposure function (NEF), a network resource function (NRF), an authentication server function (AUSF), an access and mobility management function (AMF), a policy control function (PCF), a session management function (SMF), a unified data management (UDM) function, a user plane function (UPF), and/or an application function (AF). For example, some or all of the functions discussed herein can indicate a stressed UPF, transmit or receive a migration request, transmit or receive an indication of a revised route, etc., associated with the various functions to an SMF and/or UPF (or other component), such that the SMF or other component can select a particular function of a plurality of possible functions or components providing the same function. Thus, the system, devices, and techniques broadly apply to migrating communication sessions, and are not limited to a particular context or function, as discussed herein.

As used herein, the term "signaling system," and its equivalents, can refer to a system in a network configured to handle control plane data. In some cases, a signaling system can select and/or manage user plane systems that carry data traffic through the network. For example, a signaling system can be or include a session management function (SMF). In another example, a signaling system can be or include a packet data network (PDN) gateway-C (PGW-C).

As used herein, the terms "communication session," "session," and their equivalents, can refer to an exchange of data between two or more communicating nodes or devices. A communication session can be temporary, such that it is established at a first time and ceased at a second time. In various implementations, a communication session includes the transfer of user plane data between two or more nodes.

As used herein, the term "node," and its equivalents, can refer to one or more devices that transmit and/or receive data in a network. In some instances, a first node can transmit and/or receive data from a second node.

As used herein, the terms "network path, "path," and their equivalents, can refer to a pathway over which data can be transferred between at least two terminal nodes or devices. In some cases, a path may include one or more intermediary nodes and/or one or more interfaces between the terminal nodes.

As used herein, the term "route," and its equivalents, can refer to an instruction or indication to transfer data along a particular network path. For example, when an entity is connected to a first node via a first interface and to a second node via a second interface, a first route may be an instruction for the entity to transmit data over the first interface to the first node, and a second route may be an instruction for the entity to transmit data over the second interface to the second node.

As used herein, the term "migrating," and its equivalents, can refer to moving at least a portion of something to a different location. For example, a communication session can be migrated to a particular path by ensuring that the data exchanged in the communication session traverses the particular path rather than a previous path.

As used herein, the term "heartbeat," and its equivalents, can refer to a repeatedly transmitted and/or received message. The repeated message can be transmitted or received by a network node. In some instances, a heartbeat can be a repeated echo request message or a repeated echo response message in a repeated ping operation. In some cases, a heartbeat is expected to be transmitted and/or expected to be received periodically.

The systems, devices, and techniques described herein can be implemented in a number of ways. Example implementations are provided below with reference to the following figures.

FIG. 1 is a diagram illustrating example signaling 100 between a user equipment (UE) and various components of a mobile network, such as a fifth generation (5G) mobile network, as described herein. As illustrated, the signaling 100 includes interactions between a user equipment (UE) 102, a session management function (SMF) 104, a first user plane function (UPF) 110(1), a second UPF 110(2), and a domain or data network (DN) 110. As can be understood in the context of this disclosure, the example signaling 100 is not limited to the components described in FIG. 1 and can include other components and operations.

In accordance with various embodiments described herein, the terms "user equipment (UE)," "user device," "wireless communication device," "wireless device," "communication device," "mobile device," and "client device," can be used interchangeably herein to describe any UE (e.g., the UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over internet protocol (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future internet protocol (IP)-based network technology or evolution of an existing IP-based network technology.

In general, the UE 102 can be implemented as any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

The UE 102 is configured to utilize various RANs, such as RAN 104, in order to access the DN 110. In general, the DN 110 is agnostic to the access technology that is used to connect a UE to the DN 110. In this manner, the UE 102 can connect to the DN 110 via the RAN 104, which can include a 3rd Generation Partnership Project (3GPP) RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. If the UE 102 accesses the DN 110 through a Wi-Fi access network, the RAN 104 may include a Wi-Fi access point (AP). Providing access to the DN 110 through non-3GPP RANs has opened the door to recent advancements in IMS-based services, such as the introduction of Wi-Fi calling, which allows users to initiate and receive calls over an available Wi-Fi AP. Environments can include any number and type of base stations representing any number and type of macrocells, microcells, picocells, or femtocells, for example, with any type or amount of overlapping coverage or mutually exclusive coverage.

In general, the SMF 106 can be implemented as a network function including functionality to manage communication sessions by and between UEs, and/or to provide internet protocol (IP) addresses to the UEs. In some instances, the SMF 106 can select a UPF (e.g., the first UPF 108(1) and/or the second UPF 108(2) to provide services to the UE 102 in response to receiving a request from the UE 102, as discussed herein.

In general, each of the first and second UPFs 108(1) and 108(2) can be implemented as a network function including functionality to control data transfer between the UE 102 and the various components of the network. In some instances, one or both of the first and second UPFs 108(1) and 108(2) can include functionality to act as an anchor point for radio access technology (RAT) handover (e.g., inter and intra), external protocol data unit (PDU) session point of interconnect to a data network (e.g., the internet), packet routing and forwarding, packet inspection and user plane portion of policy rule enforcement, traffic usage reporting, traffic routing, Quality of Service (QoS) handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be one or more UPFs in addition to UPFs 110(1) and 110(2), which are associated with a network and/or with the UE 102.

In general, the DN 110 can include any public or private network(s), such as the Internet. In addition, the DN 110 may include one or more devices that can receive and transmit data. For example, the DN 110 may include any of media server(s), user device(s), and the like.

In general, a user can further utilize the UE 102 to communicate with other users and associated UEs via an IP multimedia subsystem (IMS) core (sometimes referred to as the "IMS core network," the "IMS network," the "Core Network (CN)," or the "IM CN Subsystem"), which can be at least a portion of the DN 110. IMS is an architectural framework defined by the 3GPP for delivering IP multimedia to a UE, such as the UE 102. The IMS core can be maintained and/or operated by one or more service providers, such as one or more wireless carriers ("carriers"), that provide IMS-based services to users who are associated with UEs, such as the UE 102. For example, a service provider can offer multimedia telephony services that allow a user to call or message other users via the IMS core using his/her UE. A user can also utilize an associated UE to receive, provide, or otherwise interact with various different IMS-based services by accessing the IMS core. It is to be appreciated that any number of base stations and/or IMS nodes can be included in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (e.g., a voice-based communication session, such as a VoLTE call, or a Wi-Fi call).

Turning to the signaling 100, the UE 102 may transmit a session request 112 to the RAN 104. The RAN 104 may forward the session request 112 to the SMF 106. In some instances, the RAN 104 can forward the session request 112 to an application management function (AMF), which can then transmit an indication of the session request 112 to the SMF 106.

In particular implementations, the session request 112 may be a request by the UE 102 for services from the DN 110. In various examples, the services can be any of voice services, Internet browsing services, data streaming services, and the like. The UE 102 may be requesting a communication session with a destination in the DN 110 or beyond the DN 110. For example, the UE 102 may be requesting a voice call with another device connected to, or part of, the DN 110. In some examples, the UE 102 may be requesting to stream a video from a media server in the DN 110. Although FIG. 1 illustrates a call initiated by the UE 102, in some cases, the call may be initiated by the other device connected to, or part of, the DN 110.

In response to receiving the session request 112, the SMF 106 may transmit a services request 114 to the first UPF 108(1). In some cases, the SMF 106 can transmit the services request 114 over an N4 interface with the first UPF 108(1). The first UPF 108(1) may further forward the services request 114 to the DN 110. In some cases, the first UPF 108(1) can transmit the services request 114 over an N6 interface with the DN 110.

In particular implementations, the services request 114 may be a request by the SMF 106 to establish the communication session with the UE 102. The services request 114 may specify the UE 102, the first UPF 108(1), the destination of the communication session (e.g., a destination associated with DN 110), or a combination thereof. For example, the services request 114 may specify an IP address assigned to the UE 102 and/or routing information indicating that data destined for the IP address assigned to the UE 102 should be transmitted along a particular path (or route) that includes the first UPF 108(1).

In response to receiving the services request 114, a communication session may be initiated between the UE 102 and the DN 110. In the communication session, first data 116 may be transmitted between the UE 102 and the DN 110 by the RAN 104 and the first UPF 108(1). In some cases, the first data 116 is transmitted over a wireless link between the UE 102 and the RAN 104, over an N3 interface between the RAN 104 and the first UPF 108(1), and an N6 interface between the first UPF 108(1) and the DN 110. The wireless link, the RAN 104, the N3 interface, the first UPF 108(1), and the N6 interface may be included in a first network path corresponding to the communication session. The first data 116 may include uplink data and/or downlink data associated with the communication session. For example, the first data 116 may include the services requested by the UE 102 in the session request 112.

After the communication session has been established, the SMF 106 may receive a stress indication 118 from the first UPF 108(1). The stress indication 118 may be received over the N4 interface between the SMF 106 and the first UPF 108(1). In some cases, the stress indication 118 can include one or more irregular heartbeat messages. For instance, the stress indication 118 may include a heartbeat message that is received later than a receipt time expected by the SMF 106.

In various implementations, the stress indication 118 may indicate that the first UPF 108(1) is stressed. In some examples, the stress indication 118 may inform the SMF 106 that the first UPF 108(1) is failing, has failed, is overloaded, or the like. In some cases, the stress indication 118 comprises one or more periodic heartbeat messages that have been delayed and/or interrupted. In particular cases, the stress indication 118 is an offloading request generated by the first UPF 108(1).

When the SMF 106 determines that the first UPF 108(1) is stressed, the SMF 106 may migrate the communication session from the first path to a second path. The second path may exclude the first UPF 108(1). Accordingly, interruptions in the communication session due to a failure and/or overloading condition of the UPF 108(1) can be prevented.

In response to receiving the stress indication 118 from the first UPF 108(1), the SMF 106 may transmit a migration request 120 to the second UPF 108(2). The migration request 120 may be transmitted over an N4 interface between the SMF 106 and the second UPF 108(2). In some implementations, the second UPF 108(2) is an existing node that is connected to the SMF 106 prior to the SMF 106 receiving the stress indication 118. In particular instances, the second UPF 108(2) is not generated in response to the stress indication 118. In some examples, the second UPF 108(2) is not a virtual machine instance of the first UPF 108(1). The migration request 120 may include, or otherwise indicate, one or more sessions to be migrated to the second UPF 108(2), in particular implementations.

In various implementations, the migration request 120 instructs the second UPF 108(2) to handle data traffic in the existing communication session between the UE 102 and the DN 110. According to particular implementations, the migration request 120 may include, or otherwise indicate, one or more sessions that are to be migrated to the second UPF 108(2). In some cases, these one or more sessions include all sessions that were previously served by the first UPF 108(1). The migration request 120 may instruct the second UPF 108(2) to export a revised route to one or more nodes in the existing first path, such as to the RAN 104 and/or the DN 110. In some cases, the migration request 120 may instruct the second UPF 108(2) to export a revised route to at least one node that is preconfigured to transmit data associated with the communication session to the first UPF 108(1).

In response to receiving the migration request 120, the second UPF 108(2) may transmit a first revised route indication 122 to a node in the first path that is connected to the first UPF 108(1). In the example illustrated in FIG. 1, this node is the DN 110 itself. When the node is the DN 110, the first revised route indication 122 may be transmitted over an N6 interface. When the node is another UPF connected between the first UPF 108(1) and the DN 110, the first revised route indication 122 may be transmitted over an N9 interface.

In particular implementations, the first revised route indication 122 may instruct the node (e.g., the DN 110) to transmit data packets destined for the UE 102 to the second UPF 108(2) rather than the first UPF 108(1). For example, upon receiving the first revised route indication 122, a server within the DN 110 may amend an entry of a routing table associated with an IP address of the UE 102. The amended entry of the routing table may cause the server to route downlink data packets for the UE 102 to the second UPF 108(2), rather than to the first UPF 108(1).

In addition, in response to receiving the migration request 120, the second UPF 108(2) may transmit a second revised route indication 124 to a node in the first path that is connected to the first UPF 108(1). In the example illustrated in FIG. 1, this node is the RAN 104 itself. When the node is the RAN 104, the second revised route indication 124 may be transmitted over an N3 interface. When the node is another UPF connected between the first UPF 108(1) and the RAN 104, the second revised route indication 122 may be transmitted over an N9 interface.

In particular implementations, the second revised route indication 124 may instruct the node (e.g., the RAN 104) to transmit data packets from the UE 102 to the second UPF 108(2) rather than the first UPF 108(1). For example, upon receiving the second revised route indication 124, the RAN 104 may amend an entry of a routing table associated with an IP address of the UE 102. The amended entry may cause the RAN 104 to route uplink data packets from the UE 102 to the second UPF 108(2), rather than to the first UPF 108(1).

In some implementations, the first revised route indication 122 and/or the second revised route indication 124 may indicate a route associated with a range of IP addresses associated with communication sessions that should be migrated, wherein the range includes the IP address of the UE 102. In certain cases, an IP network associated with the DN 110 and/or the RAN 104 is informed of the migration via the first revised route indication 122.

After the first revised route indication 122 and the second revised route indication 124 have been transmitted to the nodes in the first path (e.g., the DN 110 and the RAN 104, respectively), second data 126 may be transmitted between the UE 102 and the DN 110. The second data 126 may be part of same communication session as the first data 126, such that the communication session is substantially uninterrupted by the migration to the new path including the second UPF 108(2). The second data 126 may be transmitted between the UE 102 and the DN 110 by the RAN 104 and the second UPF 108(2). In some cases, the second data 126 is transmitted over a wireless link between the UE 102 and the RAN 104, over an N3 interface between the RAN 104 and the second UPF 108(2), and an N6 interface between the second UPF 108(2) and the DN 110. The wireless link, the RAN 104, the N3 interface, the second UPF 108(2), and the N6 interface may be included in a second network path corresponding to the communication session. The second data 126 may include uplink data and/or downlink data associated with the communication session. For example, the second data 126 may include the services requested by the UE 102. In various implementations, the services delivered to the UE 102 may not be noticeably interrupted by the migration of the communication session from the first path to the second path.

Additional details of an example network are discussed below in connection with FIG. 2.

Figure 2:
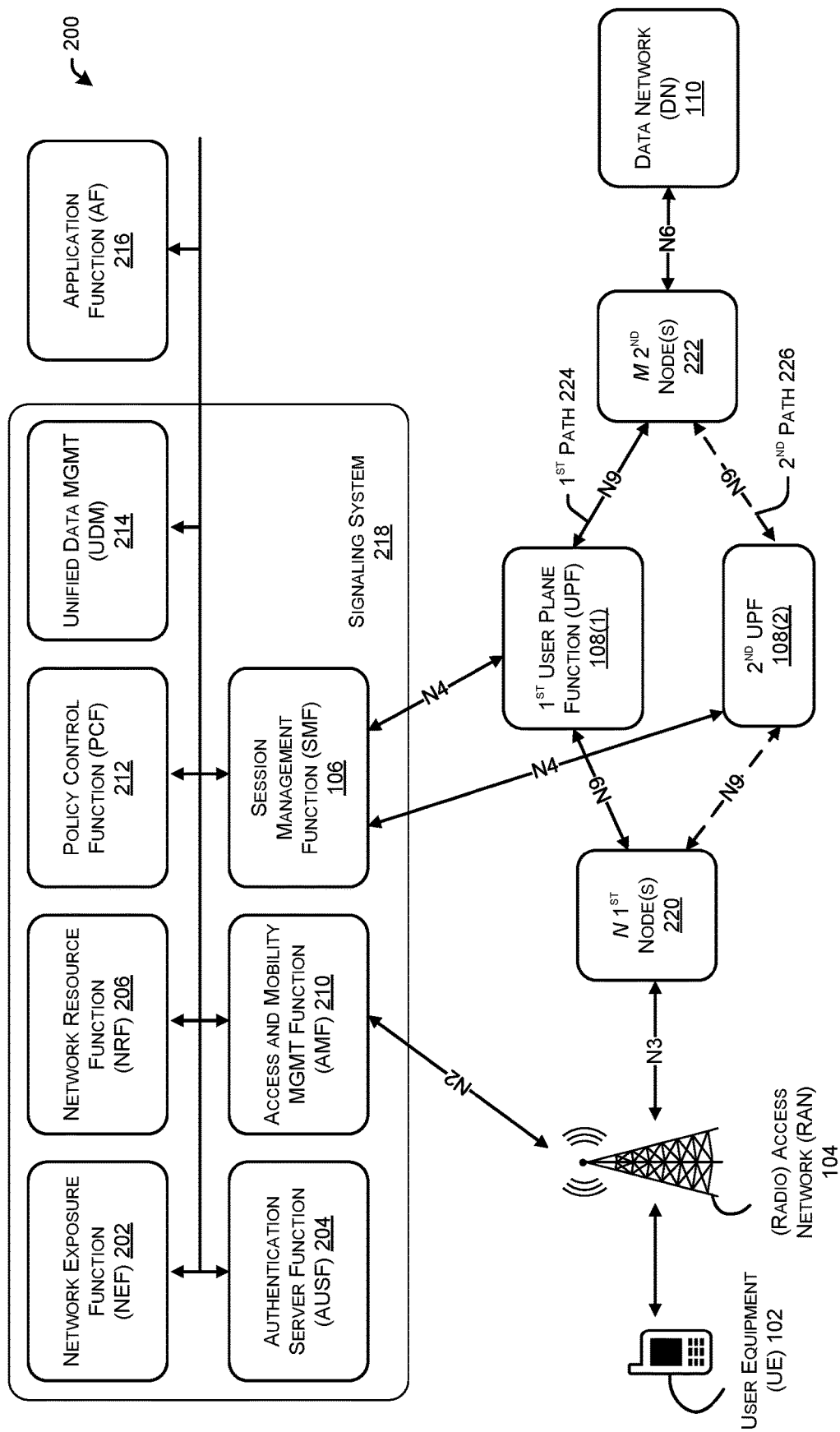
FIG. 2 illustrates an example environment including a UE and various components implementing session migration, as described herein.

FIG. 2 illustrates an example environment 200 including a user equipment (UE) and various components implementing session migration, as described herein. For example, the environment 200 includes the UE 102, the (radio) access network (RAN) 104, the session management function (SMF) 106, the first and second user plane functions (UPFs) 108(1) and 108(2), and the domain or data network (DN), as discussed in connection with FIG. 1, as well as a network exposure function (NEF) 202, an authentication server function (AUSF) 204, a network resource function (NRF) 206, an access and mobility management function (AMF) 210, a policy control function (PCF) 212, a unified data management (UDM) 214, and an application function (AF) 216. A signaling system 218 can include the NEF 202, the AUSF 204, the NRF 206, the AMF 210, the PCF 212, the SMF 196, and the UDM 214. Further, the environment includes n first node(s) 220 connected between the RAN 104 and the first and second UPFs 108(1) and 108(2), as well as m second node(s) 222 connected between the first and second UPFs 108(1) and 108(2) and the DN 110.

In general, the NEF 202 can be implemented as a network function including functionality to securely expose services and/or capabilities provided by and amongst the various network functions, as discussed herein. In some instances, the NEF 202 receives information from other network functions and can store the received information as structured data using an interface to a data storage network function.

In general, the AUSF 204 can be implemented as a network function including functionality to provide authentication to various devices in the network. For example, the AUSF 204 can request device credentials (e.g., security key(s)), verify that a device is authorized to connect to a network, and/or control access to the network based on the device credentials.

In general, the NRF 206 can be implemented as a network function including functionality to support service discovery (e.g., receive a network function discovery request and provide information associated with the discovered network function instances to a requesting entity). In some instances, the NRF 206 can receive utilization information, capability information, etc. from various network functions, such as the UPFs 108(1) and 108(2), to provide such utilization information to the other components discussed herein. Further, the NRF 206 can select, assign, implement, or otherwise determine network functions to be used in a network based at least in part on utilization information, as discussed herein.

In general, the AMF 210 can be implemented as a network function including functionality to provide UE-based authentication, authorization, mobility management, etc., to various UEs. In some instances, the AMF 210 can include functionality to terminate a RAN control plane interface between the UE 102 and other functions on the network. In some instances, the AMF 210 can include functionality to perform registration management of the UE 102 in a network, connection management, reachability management, mobility management, access authentication, access authorization, security anchor functionality (e.g., receiving and/or transmitting security keys during registration/authorization), and the like.

In general, the PCF 212 can be implemented as a network function including functionality to support unified policy framework to govern network behavior, provide policy rules to control plane functions and/or enforce such rules, and/or implement a front end to access subscription information relevant for policy decisions in a data repository.

In general, the UDM 214 can be implemented as a network function including functionality to process authentication credentials, handle user identification processing, manage registration and/or mobility, manage subscriptions between a UE and a carrier, and/or manage short message service (SMS) data.

In general, the AF 216 can be implemented as a network function including functionality to route traffic to/from applications operating on the network, facilitate accessing the NEF 202, and interact with the policy framework for policy control in connection with the PCF 212.

In general, the n first node(s) 220 may include one or more network nodes between the RAN 104 and the first UPF 108(1), as well as between the RAN 104 and the second UPF 108(2). In some cases, the n first node(s) 220 include multiple nodes that are connected to each other in series. As used herein, n can be a positive integer. In various examples, each one of the n first node(s) 220 is a UPF that is separate from the first and second UPFs 108(1) and 108(2). The n first node(s) 220 may be connected to the RAN 104 by an N3 interface, connected to the first UPF 108(1) by a first N9 interface, and connected to the second UPF 108(2) by a second N9 interface. In some implementations, the n first node(s) 220 are omitted from the environment 200, such that the RAN 104 is connected to the first UPF 108(1) via a single (N3) interface and to the second UPF(2) via a single (N3) interface.

In general, the m second node(s) 222 may include one or more network nodes between the first UPF 108(1) and the DN 110, as well as between the second UPF 108(2) and the DN 110. In some cases, the m second node(s) 222 include multiple nodes that are connected to each other in series. As used herein, m can be a positive integer. In various examples, each one of the m second node(s) 222 is a UPF that is separate from the first and second UPFs 108(1) and 108(2) and is separate from any UPFs included in the n first node(s) 220. The m second node(s) 222 may be connected to the first UPF 108(1) by a third N9 interface, connected to the second UPF 108(2) by a fourth N9 interface, and connected to the DN 110 by an N6 interface. In some implementations, the m second node(s) are omitted from the environment 200, such that the DN 110 is connected to the first UPF 108(1) via a single (N6) interface and connected to the second UPF 108(2) via a single (N6) interface.

In general, the signaling system 218 can be implemented as a technology configured to establish a communication session between the UE 102 and the DN 110. In some implementations, the RAN 104 transmits a request for services from the UE 102 to the AMF 210. In certain examples, the AMF 210 requests the SMF 106 to select a UPF to provide the services between the UE 102 and the DN 110. For example, the SMF 106 may initially select the first UPF 108(1) to provide services between the UE 102 and the DN 110. As a result of establishing the communication session, services can be transmitted between the UE 102 and the DN 110 over a first path 224, which can include a wireless link between the UE 102 and the RAN 104, the RAN 104, the N3 interface, the n first node(s) 220, the first N9 interface between the n first node(s) 220 and the first UPF 108(1), the first UPF 108(1), the third N9 interface between the first UPF 108(1) and the m second node(s) 222, and the N6 interface.

In general, the signaling system 218 can be implemented as a technology configured to migrate a communication session from one UPF to another UPF. In some cases, the SMF 106 may determine that the first UPF 108(1) is stressed while providing services between the UE 102 and the DN 110. In response, the SMF 106 may migrate the communication session from the first UPF 108(1) to the second UPF 108(2).

In some cases, the SMF 106 may transmit a migration request (e.g., migration request 120) to the second UPF 108(2), which may cause the second UPF 108(2) to export revised route(s) to nodes in the first path that are connected to the first UPF 108(1). For example, the second UPF 108(2) may transmit a revised route to the n first node(s) 220 (e.g., at least one of the n first node(s) 220 that is connected to the first UPF 108(1) via a single interface), which may cause the one first node 220 to transmit data from the UE 102 to the second UPF 108(2) over the second N9 interface, rather than to the first UPF 108(1) over the first N9 interface. For example, the n first node(s) 224 may amend or rewrite an entry of a routing table associated with an identification (e.g., an Internet Protocol (IP) address) of the UE 102. In some cases, the second UPF 108(2) may transmit a revised route to the m second node(s) 222 (e.g., at least one of the m second node(s) 222 that is connected to the first UPF 108(1) via a single interface), which may cause the m second node(s) 222 to transmit data destined for the UE 102 to the second UPF 108(2) over the fourth N9 interface, rather than to the first UPF 108(1) over the third N9 interface. For example, the m second node(s) 222 may amend or rewrite an entry of a routing table associated with an identification (e.g., the IP address) of the UE 102.

As a result of migrating the communication session, data corresponding to the communication session may be provided via a second path 226, which may include the wireless link between the UE 102 and the RAN 104, the second N3 interface between the RAN 104 and the second UPF 108(2), the second UPF 108(2), and the second N6 interface between the second UPF 108(2) and the DN 110. In various implementations, the migration of the communication session from the first path including the first UPF 108(1) to the second path including the second UPF 108(2) can be performed without interrupting or delaying services provided to the UE 102 in the communication session.

In general, the devices and network functions illustrated in the environment 200 can be communicatively coupled via one or more control planes which can pass controls and signaling by and between the various components discussed herein. Further, the environment 200 can include a plurality of each of the various functions (e.g., the SMF 106 can represent a plurality of SMFs, for example). The environment 200 can further include additional functions and is not limited to those represented in FIG. 2.

Figure 3:
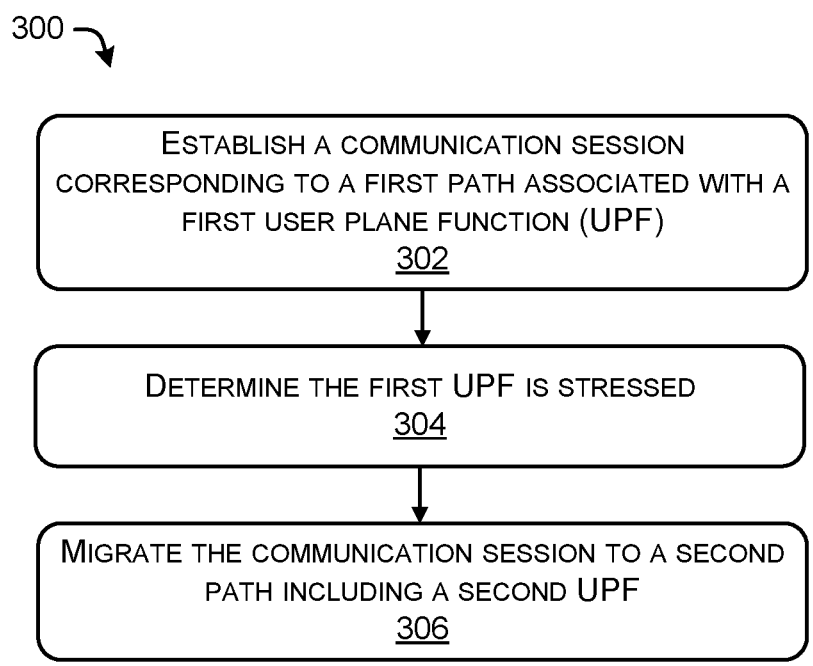
FIGS. 3-5 illustrate various processes for migrating communication sessions, as described herein.
Figure 4:
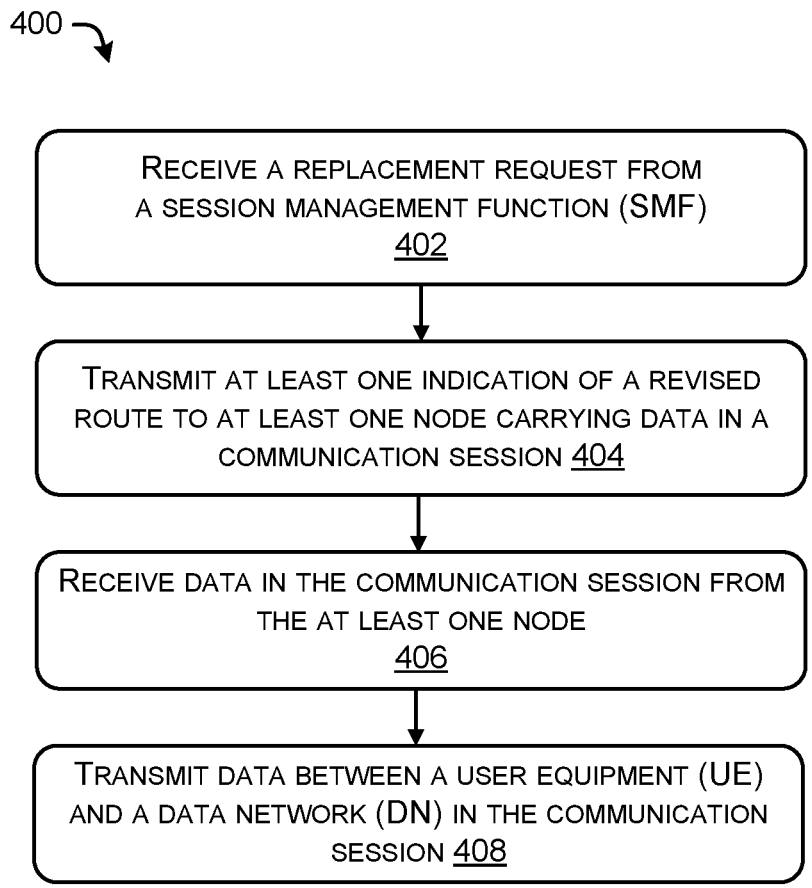
Figure 5:
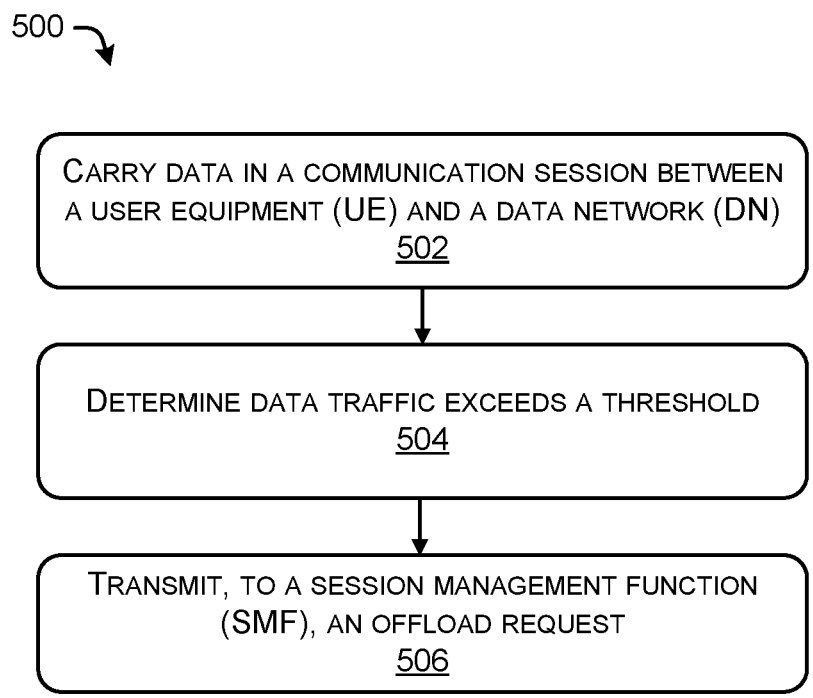

FIGS. 3-5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates a process 300 for migrating a communication session according to implementations of the disclosure. Process 300 may be performed by at least one of a session management function (SMF) (e.g., SMF 106) or a signaling system (e.g., signaling system 218), for example.

At 302, a communication session corresponding to a first path associated with a first user plane function (UPF) is established. In particular implementations, the communication session is between a user equipment (UE) and a domain or data network (DN). The communication session can include data traversing a first path between the UE and the DN. The data may correspond to services exchanged between the UE and the DN. For example, the data may include voice services traversing the first path from the DN to the UE.

According to various implementations, the first path includes one or more nodes and multiple interfaces between the UE and the DN. In some cases, the first path includes the first UPF. The first UPF may receive and transmit the data as one of the nodes between the UE and the DN. In some cases, the first UPF was initially selected by the SMF to provide services between the UE and the DN.

At 304, the first UPF is determined to be stressed. In some implementations, an offload request is received from the first UPF. The offload request could be in response to the first UPF determining that it is handling more than a threshold of data traffic. In certain implementations, 304 includes determining that a periodic heartbeat message received from the first UPF has been delayed or interrupted. For example, a heartbeat message from the first UPF may be received later than an expected time, may never be received, and the like. When the first UPF is stressed, the first UPF may be in danger of disrupting and/or delaying the data exchanged between the UE and the DN in the communication session.

At 306, the communication session is migrated to a second path including a second UPF. In various implementations, 306 is performed in response to determining that the first UPF is determined to be stressed at 304. In various implementations, multiple communication sessions corresponding to the first path are migrated to the second path.

In particular instances, 306 includes transmitting a migration request to the second UPF. The migration request may instruct the second UPF to transmit at least one indication of a revised route to at least one node in the first path. In some cases, the second UPF is an existing UPF that is connected to a device performing process 300, but unlike the first UPF, is determined to not be stressed.

In various implementations, the migration request instructs the second UPF to transmit an indication to a node in the first path that is connected to the first UPF. The node, for example, may be connected to the first UPF by a single interface. In some cases, the node may have forwarded data in the communication session to the first UPF. In particular implementations, the node is at least one of a third UPF, a radio access network (RAN) connected to the UE, or the DN itself.

In particular implementations, the revised route includes the second UPF. For example, an indication of a revised route may instruct a node to transmit data in a communication session to the second UPF. The indication may cause the node to transmit data to the second UPF rather than the first UPF, in certain examples.

As a result of process 300, the communication session between the UE and the DN may be migrated from the first path (including the stressed first UPF) to a second path (including the non-stressed second UPF). In some examples, the UE may not experience any significant interruptions in the communication session that are due to the stress experienced by the first UPF or due to the migration itself.

FIG. 4 illustrates a process 400 for migrating a communication session according to implementations of the disclosure. Process 400 may be performed by a user plane function (UPF) (e.g., second UPF 108(2)), for example.

At 402, a replacement request is received from a session management function (SMF). The migration request may include an instruction to transmit at least one indication of a revised route to at least one network node. In various implementations, the migration request may identify an existing communication session including data traversing a first path through the network and/or identify the network node in the first path.

In some cases, the migration request includes an indication of a user equipment (UE) associated with the communication session. For example, the migration request may include an internet protocol (IP) address of the UE, an IP address of a server in a domain or data network (DN) communicating with the UE in the session, or a combination thereof.

In various implementations, the network node may be part of a first path over which data in the communication session has previously traversed. In some cases, the network node is a network node that is connected with a stressed, first UPF via a single interface. In particular implementations, the node is at least one of a third UPF connected to the first UPF via a single N9 interface, a radio access network (RAN) connected to the first UPF via a single N3 interface, or the DN itself connected to the first UPF via a single N6 interface.

At 404, at least one indication of a revised route is transmitted to the at least one node carrying data in the communication session. In some cases, the node may have forwarded data in the communication session to the first UPF at least prior to 402 and/or 404.

In some cases, the revised route includes a device performing the process 400, e.g., the second UPF. For example, the at least one indication of the revised route may instruct the node to transmit data in the communication session to the second UPF. The indication may cause the node to transmit data to the second UPF rather than the first UPF, in certain examples.

According to particular implementations, the indication of the revised route instructs the node to update a routing table managed by the node. In some examples, the indication may instruct the node to update an entry in the routing table that is associated with the communication session. In some cases, the indication includes an identifier of the UE (e.g., an IP address of the UE), an identifier of the DN (e.g., an IP address of one or more servers in the DN), or a combination thereof. Using the identifier(s) in the indication, the node may identify an entry associated with the communication session and amend the entry to indicate that data in the communication session should be forwarded by the node to the second UPF, rather than to the first UPF.

At 406, data in the communication session is received from the at least one node. In various implementations, the node routed the data along the revised route in response to receiving the indication of the revised route. The data may be destined for the UE or the DN.

At 408, the data is transmitted between the UE and the DN in the communication session. The data may be transmitted to another node in the first path between the UE and the DN. In various implementations, the node is connected to the first UPF via a single interface. In some cases, the node can be at least one of a fourth UPF, the RAN, or the DN itself.

As a result of process 400, the communication session between the UE and the DN may be migrated from the first path (including the stressed, first UPF) to a second path (including the second UPF, which may not be stressed). In some examples, the UE may not experience any significant interruptions in the communication session that are due to stress experienced by the first UPF or due to the migration itself.

FIG. 5 illustrates a process 500 for migrating a communication session according to implementations of the disclosure. Process 500 may be performed by a network node, such as a user plane function (UPF) (e.g., first UPF 108(1)), for example.

At 502, data in a communication session is carried by a network node between a user equipment (UE) and a domain or data network (DN). The data may traverse a network through a first path, which includes one or more nodes and multiple interfaces connecting the nodes. In some cases, the first path includes the device performing the process 500.

At 504, data traffic traversing the network node is determined to exceed a threshold. The data traffic may include data outside of the communication session as well as the data in the communication session. For example, the data traffic may be associated with various other communication sessions between other UEs and/or other DNs. The threshold may be a static threshold or a dynamic threshold.

At 506, an offload request is transmitted by the network node to the SMF. The offload request may instruct the SMF to migrate at least a portion of the data traffic to a path that excludes the network node. For example, the offload request may instruct the SMF to migrate the communication session to a different network node.

As a result of process 500, the SMF may cause migration of the communication session from a first path (including the network node performing process 500) to a second path (excluding the network node performing process 500). Accordingly, interruptions to the communication session as a result of the network node being overloaded can be prevented.

Figure 6:
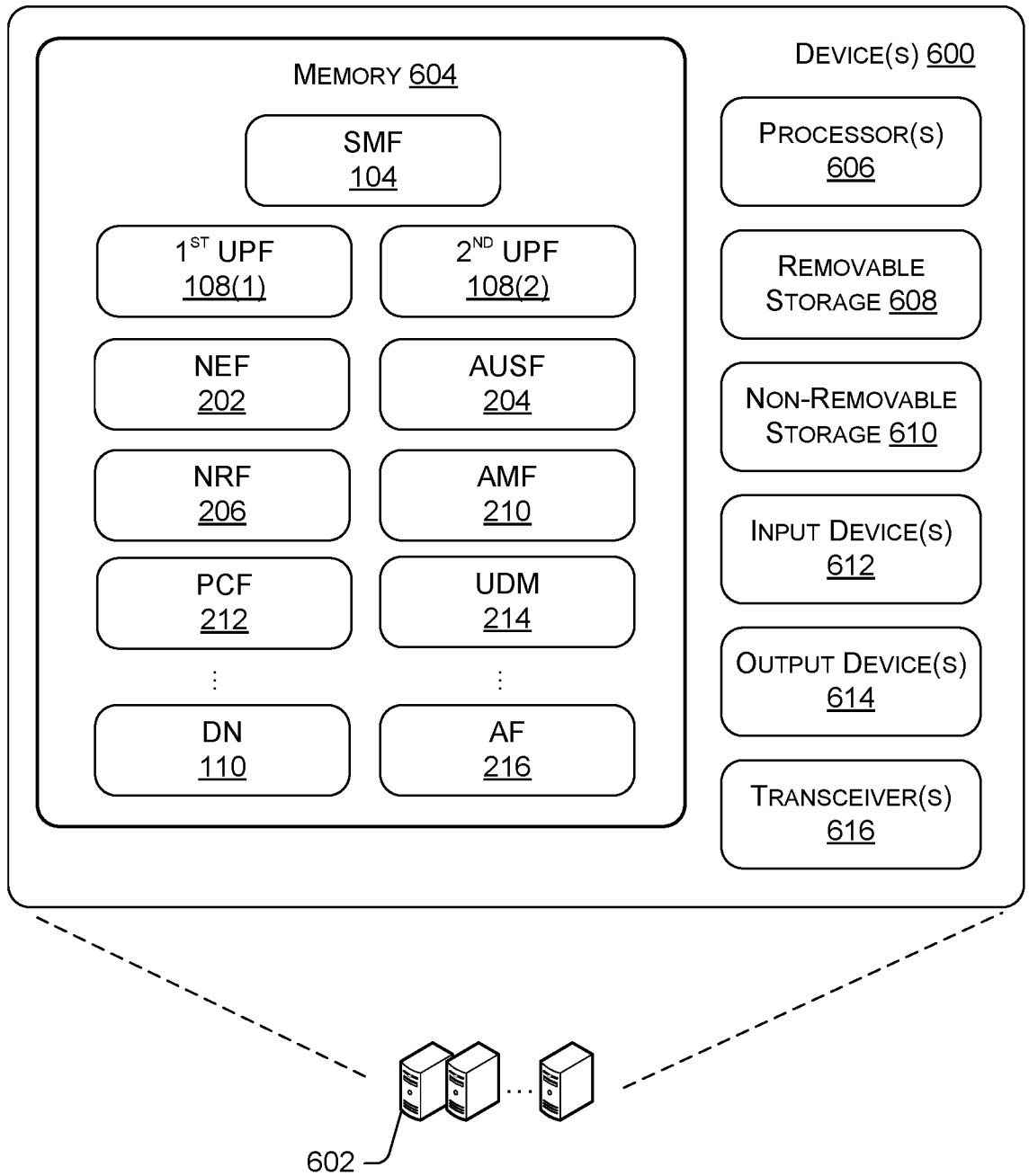
FIG. 6 illustrates example device(s) to implement session migration, as described herein.

FIG. 6 illustrates example device(s) 600 to implement session migration, as described herein. In some embodiments, some or all of the functionality discussed in connection with FIGS. 1-5 can be implemented in the device(s) 600. Further, the device(s) 600 can be implemented as one or more server computers 602, a network element on a dedicated hardware, as a software instance running on a dedicated hardware, or as a virtualized function instantiated on an appropriate platform, such as a cloud infrastructure, and the like. It is to be understood in the context of this disclosure that the device(s) 600 can be implemented as a single device or as a plurality of devices with components and data distributed among them.

As illustrated, the device(s) 600 comprise a memory 604 storing the session management function (SMF) 104, the first user plane function (UPF) 108(1), the second UPF 108(2), the network exposure function (NEF) 202, the authentication server function (AUSF) 204, the network resource function (NRF) 206, the access and mobility management function (AMF) 208, the unified data management (UDM) 210, the policy control function (PCF) 212, the domain or data network (DN) 214, and the application function (AF) 216, and to provide functionality to the device 600 to facilitate improved user plane system selection based on latency, as described herein. In various embodiments, the memory 604 may also comprise additional functions and structures that are not explicitly described herein. Also, the device 600 includes processor(s) 606, at least one removable storage 608 and at least one non-removable storage 610, input device(s) 612, output device(s) 614, and transceiver(s) 616.

Aspects of the SMF 104, the first and second UPFs 108(1) and 108(2), the NEF 202, the AUSF 204, the NRF 206, the AMF 210, the PCF 212, the UDM 214, the DN 110, and the AF 216 are discussed above with connection with at least FIGS. 1 and 2. In general, these functions comprise aspects of a fifth generation (5G) mobile network.

In various embodiments, the memory 604 is volatile (such as RAM), non-volatile (such as ROM, flash memory, etc.) or some combination of the two. One or more of the SMF 104, the first and second UPFs 108(1) and 108(2), the NEF 202, the AUSF 204, the NRF 206, the AMF 210, the PCF 212, the UDM 214, the DN 110, and the AF 216 stored in the memory 604 can comprise methods, threads, processes, applications or any other sort of executable instructions. One or more of the SMF 104, the first and second UPFs 108(1) and 108(2), the NEF 202, the AUSF 204, the NRF 206, the AMF 210, the PCF 212, the UDM 214, the DN 110, and the AF 216 can also include files and databases.

In some embodiments, the processor(s) 606 is a central processing unit (CPU), a graphics processing unit (GPU), or both CPU and GPU, or other processing unit or component known in the art.

The device 600 also includes additional data storage devices (removable and/or non-removable) such as, for example, magnetic disks, optical disks, or tape. Such additional storage is illustrated in FIG. 6 by removable storage 608 and non-removable storage 610. Tangible computer-readable media can include volatile and nonvolatile, removable and non-removable media implemented in any method or technology for storage of information, such as computer readable instructions, data structures, program modules, or other data. Memory 604, removable storage 608 and non-removable storage 610 are all examples of computer-readable storage media. Computer-readable storage media include, but are not limited to, RAM, ROM, EEPROM, flash memory or other memory technology, CD-ROM, digital versatile discs (DVDs), content-addressable memory (CAM), or other optical storage, magnetic cassettes, magnetic tape, magnetic disk storage or other magnetic storage devices, or any other medium which can be used to store the desired information and which can be accessed by the device 600. Any such tangible computer-readable media can be part of the device 600.

The device 600 also can include input device(s) 612, such as a keypad, a cursor control, a touch-sensitive display, voice input device, etc., and output device(s) 614 such as a display, speakers, printers, etc. These devices are well known in the art and need not be discussed at length here.

As illustrated in FIG. 6, the device 600 also includes one or more wired or wireless transceiver(s) 616. For example, the transceiver(s) 616 can include a network interface card (NIC), a network adapter, a local area network (LAN) adapter, or a physical, virtual, or logical address to connect to the various base stations or networks contemplated herein, for example, or the various user devices and servers. To increase throughput when exchanging wireless data, the transceiver(s) 616 can utilize multiple-input/multiple-output (MIMO) technology. The transceiver(s) 616 can comprise any sort of wireless transceivers capable of engaging in wireless, radio frequency (RF) communication. The transceiver(s) 616 can also include other wireless modems, such as a modem for engaging in Wi-Fi, WiMAX, Bluetooth, or infrared communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   a memory; and
   one or more components stored in the memory and executable by the one or more processors to perform operations comprising:
      establishing, between a User Equipment (UE) and a Data Network (DN), a communication session associated with a first path comprising a first User Plane Function (UPF);
      transmitting, to a second UPF, a migration request instructing the second UPF to transmit at least one indication of a revised route to at least one of a Radio Access Network (RAN) connected between the UE and the second UPF or the DN; and
      migrating the communication session to a second path between the UE and the DN, the second path comprising the second UPF.

2. The system of claim 1, wherein the at least one indication of the revised route instructs the at least one of the RAN or the DN to transmit data associated with the communication session to the second UPF.

3. The system of claim 1, wherein the migration request and the at least one indication of the revised route identify an Internet Protocol (IP) address of the UE.

4. The system of claim 1, wherein the second path further comprises a third UPF connected between the second UPF and the DN.

5. The system of claim 1, wherein transmitting the migration request further comprises transmitting the migration request instructing the second UPF to transmit, over an N6 interface, an indication of the revised route to the DN.

6. The system of claim 1, wherein transmitting the migration request further comprises transmitting the migration request instructing the second UPF to transmit, over an N3 interface, an indication of the revised route to the RAN.

7. The system of claim 1, wherein transmitting the migration request further comprises:
   determining that the first UPF is stressed in response to at least one of receiving an offload request from the first UPF or determining that a periodic heartbeat message has been interrupted; and
   transmitting the migration request in response to determining that the first UPF is stressed.

8. A method comprising:
   establishing, between a User Equipment (UE) and a Data Network (DN), a communication session associated with a first User Plane Function (UPF);
   transmitting, to a second UPF, a migration request instructing the second UPF to transmit at least one indication of a revised route to at least one of a Radio Access Network (RAN) connected between the UE and the second UPF or the DN; and
   migrating the communication session to a path associated with the second UPF.

9. The method of claim 8, wherein the at least one indication of the revised route instructs the at least one of the RAN or the DN to transmit data associated with the communication session to the second UPF.

10. The method of claim 8, wherein the migration request and the at least one indication of the revised route identify an Internet Protocol (IP) address of the UE.

11. The method of claim 8, wherein the path comprises a third UPF connected between the second UPF and the DN.

12. The method of claim 8, wherein transmitting the migration request further comprises transmitting the migration request instructing the second UPF to transmit, over an N6 interface, an indication of the revised route to the DN.

13. The method of claim 8, wherein transmitting the migration request further comprises transmitting the migration request instructing the second UPF to transmit, over an N3 interface, an indication of the revised route to the RAN.

14. The system of claim 1, wherein transmitting the migration request further comprises:
   determining that the first UPF is stressed in response to at least one of receiving an offload request from the first UPF or determining that a periodic heartbeat message has been interrupted; and
   transmitting the migration request in response to determining that the first UPF is stressed.

15. A user plane system, comprising:
   one or more processors;
   a memory; and
   one or more components stored in the memory and executable by the one or more processors to perform operations comprising:
      receiving, from a Session Management Function (SMF), a migration request associated with a communication session between a User Equipment (UE) and a Data Network (DN), the communication session associated with a first User Plane Function (UPF);
      in response to receiving the migration request, transmitting at least one indication of a revised route to at least one of a Radio Access Network (RAN) connected between the UE and a second UPF or the DN; and
      receiving, in a path comprising the second UPF, data from the at least one of the RAN or the DN.

16. The user plane system of claim 15, wherein the operations further comprise:
   determining that a level of data traffic traversing the user plane system exceeds a threshold; and
   in response to determining that the level of data traffic exceeds the threshold, transmitting, to the SMF, an offload request.

17. The user plane system of claim 15, wherein an initial path associated with the communication session comprises the first UPF, and a third UPF connected between the first UPF and the DN.

18. The user plane system of claim 15, wherein the at least one indication of the revised route indicates an Internet Protocol (IP) address of the UE.

19. The user plane system of claim 15, wherein transmitting the at least one indication further comprises transmitting an indication of the revised route to the DN and over an N6 interface.

20. The user plane system of claim 15, wherein transmitting the at least one indication further comprises transmitting an indication of the revised route to the RAN and over an N3 interface.

* * * * *